United States Patent [19]
Egli

[11] Patent Number: 5,904,303
[45] Date of Patent: May 18, 1999

[54] SPRAY MACHINE WITH A DRIVEN ROTOR UNIT

[75] Inventor: Ernst Egli, Fahrweid, Switzerland

[73] Assignee: Sika Equipment AG, Widen, Switzerland

[21] Appl. No.: 08/727,250

[22] Filed: Oct. 8, 1996

[30] Foreign Application Priority Data

Oct. 9, 1995 [EP] European Pat. Off. ............. 95115851

[51] Int. Cl.$^6$ .................................................. B56G 53/46
[52] U.S. Cl. ............................ 239/654; 222/370; 406/66
[58] Field of Search .................................. 239/654, 655, 239/664, 681, 687, 688, 689; 222/370; 406/64, 66

[56] References Cited

U.S. PATENT DOCUMENTS

| | | | |
|---|---|---|---|
| 3,995,777 | 12/1976 | Diez et al. ............................... | 222/370 |
| 4,092,046 | 5/1978 | Bombelli et al. ..................... | 222/370 X |
| 4,376,600 | 3/1983 | Egli ........................................ | 406/64 X |
| 4,528,848 | 7/1985 | Hafner .................................. | 222/370 X |
| 4,681,484 | 7/1987 | Egger .................................... | 222/370 X |
| 5,076,501 | 12/1991 | Tschumi ................................. | 239/654 |
| 5,094,403 | 3/1992 | Tschumi ................................. | 239/654 |
| 5,433,519 | 7/1995 | Irsch ...................................... | 239/654 X |

*Primary Examiner*—Lesley D. Morris
*Attorney, Agent, or Firm*—Pearne, Gordon, McCoy & Granger LLP

[57] ABSTRACT

A spray machine having a driven rotor unit which carries, at its periphery, a plurality of bushings that are open at both sides. The bushings are arranged such that their axes point in a direction with at least one directional component parallel to an axis of the rotor unit. The bushings include a filling opening (6) at a filling arrangement (20), a pressurized air inlet opening (5), and an ejection opening (3) which is located opposite to the pressurized air inlet opening (5) relative to a direction of the bushing axes. Each of the openings are arranged so that, when the rotor unit rotates, the openings of the bushings pass over the openings. Sealing plate arrangements are provided so that the surface pressure between the sealing plate arrangements and the rotor unit in an area including the filling opening is lower than the surface pressure of the sealing plate arrangements to the rotor unit in an area including the pressurized air inlet opening and the ejection opening.

21 Claims, 7 Drawing Sheets

SPRAY MACHINE WITH A DRIVEN ROTOR UNIT

BACKGROUND OF THE INVENTION

The present invention is directed to a spray machine which comprises a driven rotor unit which rotor unit carries at its periphery a multitude of bushings which are open at both sides and which are arranged with their axes pointing in a direction with at least one direction component parallel to an axis of said rotor and comprising, stationary with respect to a machine frame, a filling opening at a filling arrangement, a pressurized air inlet opening, an ejection opening being located opposite to said pressurized air inlet opening considered in direction of said axes of said bushings, whereby all said openings are so arranged that when said rotor unit rotates, the openings of said bushings pass over said openings, and further comprising, stationary with respect to said machine frame, at both sides of said rotor unit, sealing plate arrangements.

Such spray machines are known.

In the area of the filling opening where the spray medium is filled into the bushings of the rotor, in the area of the pressurized air inlet where ejecting pressurized air acts from one side onto the spray medium filled bushings and in the area of the ejection opening, where pressurized air driven spray medium is ejected out of the bushing into a respective conveying line, sealing is necessary between the machine rotor unit and the machine stator. This is also true in the area of the filling opening if one wants to prevent contamination of the surrounding of the machine when ejecting dusty medium. It is customary to realize such sealings by means of stationary sealing plate arrangements.

It is further customary to bias the upper and the lower sealing plate arrangements with a surface pressure and substantially uniformly towards the end faces of the rotor unit. This to ensure the required seal. Such requirements are governed by the increased sealing necessity in the area of the pressurized air inlet and in the area of the ejection opening. Thereby, considerable friction forces act on the rotor unit and the respective torque has to be generated by a driving motor driving the rotor unit. Therefore powerful and bulky drive motors are required to drive the rotor unit of the spray machine.

In FIG. 1 there is schematically shown a concrete spray machine which works according to the rotor principle. Concrete is filled into a hopper 1. Below the hopper 1 a rotor 8 rotates, driven around an axis A. The rotor comprises, similar to a revolver, a multitude of receptacle bushings 7 to receive concrete. At the bottom of hopper 1 there is provided a stationary filling opening 6 so that sequentially the bushings 7, brought into alignment with the opening 6 as the rotor rotates, are filled. The bushings 7, which are respectively brought into alignment with the filling opening 6, are closed at their bottom by means of a stationary sealing plate 9.

On the side of the hopper 1 there is further provided a conduit 4 for pressurized air which is brought via an opening 5 for pressurized air into operational connection with a respective bushing 7 rotated into alignment with said opening 5. In this ejection position, aligned with the opening 5 for pressurized air, the respective bushing 7 is also aligned with an ejection opening 3 at its bottom, which opening 3 is provided in the sealing plate 9. The sealing plate 9 closes, on one hand in filling position, the respective bushing 7 at its bottom and establishes, on the other hand, for ejecting the concrete filled in the respective bushing 7, tightness around the ejection opening 3. An upper sealing plate 10 acts on the upper side of the rotor 8.

The ejection opening 3 propagates via a bent section 11 into a conveying conduit which is not shown in the figure. A conveying pipe 13 for pressurized conveyor air abuts into the curved section 11. A driven stirring arrangement 15 acts within hopper 1.

Such a concrete spray machine works according to the so-called "low density jet principle" at which the medium to be ejected, concrete, practically floats within the pressurized air which is fed by conduit 13. Thereby, the concrete is conveyed along the conveying conduit connected to the bent section 11. Along this conveying conduit water and possibly further additives are controllably added to the spray medium.

SUMMARY OF THE INVENTION

It is an object of the present invention to provide a spray machine whereat drive motors may be implied with significantly reduced driving power. Thereby, there results a less bulky construction of the overall machine.

This object is resolved by the spray machine of the type as mentioned above at which surface pressure between said sealing plate arrangements and said rotor unit in an area comprising said filling opening is lower than surface pressure of said sealing plate arrangements to said rotor unit in an area containing said pressurized air inlet opening and said ejection opening.

Thereby the inventors have recognized that in the area of the filling opening the sealing requirements between sealing plate arrangements and rotor unit are considerably lower than in the area of the pressurized air inlet and of the ejection opening mutually disposed opposite to each other. Thus, by accordingly tayloring the respective surface pressures—locally different according to the respective sealing requirements—a considerable reduction of the frictional torque may be reached which has to be applied by the driving motor. This further allows to imply smaller and less powerful driving motors.

In a preferred realization form, at least one and preferably both sealing plate arrangements are construed in two parts, namely each having a first part in the area of the filling opening, and each having a second part in the area of the pressurized air inlet and the ejection opening.

Thereby, it becomes possible in a simple manner to realize the said surface pressures according to the specific local needs in that the respective parts of the sealing plate arrangements may be in pairs biased towards or from each other independently of biasing the other pair.

Further, and in a preferred embodiment, there is provided a biasing arrangement which, preferably adjustable, biases the sealing plate arrangements towards the rotor unit and which provides for considerably higher biasing in the area of the pressurized air inlet opening and the ejection opening than in the area of the filling opening. Thus, there is realized that in optimized manner the required and necessary surface pressures are installed which provide for adequate sealing.

In a further preferred embodiment which is especially preferred, especially having an eye on easy repair and maintenance, the said two sealing plate arrangements comprise each at least two parts, one part each in the area of the filling opening and one part each in the area of the pressurized air inlet and ejection opening. The frame of the machine further comprises a modularly removable, preferably pivotable section with which those sealing plate arrangement parts which are associated to the pressurized air inlet and the ejection opening may be removed and which section further comprises a biasing arrangement with which the said parts of the sealing plate arrangements may controllably be biased towards the end faces of the rotor unit.

Thereby, it becomes possible to modularly remove, preferably by pivotment, those parts of the sealing plate arrangements which are primarily exposed to wear, whereby simultaneously the respective uncovered area of the rotor unit becomes accessible so that the rotor unit may be entirely inspected by rotating this unit subsequently into the opened area.

Preferably, the biasing arrangement comprises at least two biasing piston arrangements which are distributed along and cooperating with the said parts of the sealing plate arrangements.

In a further preferred embodiment, synchronous biasing of the said biasing arrangements is reached in that said arrangements cooperate with respective cylinder/piston arrangements whereby each cylinder on one hand and a piston rod on the other hand respectively act on one of the said parts of said sealing plate arrangements so that, as said piston/cylinder arrangements are contracted, both said parts are moved towards each other, thereby being biased towards said rotor unit disposed therebetween.

In a further preferred embodiment the said two piston/cylinder arrangements are freely movable with respect to the machine frame preferably considered in biasing direction so that, as said piston/cylinder arrangements are expanded, first one of said parts of said sealing plate arrangements is lifted from the rotor unit onto an abutment and then the second of said parts of said sealing plate arrangements is lifted from the rotor unit.

Further, and in a preferred mode, said at least two piston/cylinder arrangements of the biasing arrangement are serially connected with respect to a pressure medium source and there is further provided a manually operatable pumping member as well in series and cooperating with the biasing arrangement with which, adjustably, the sealing biasing may be installed.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 2:
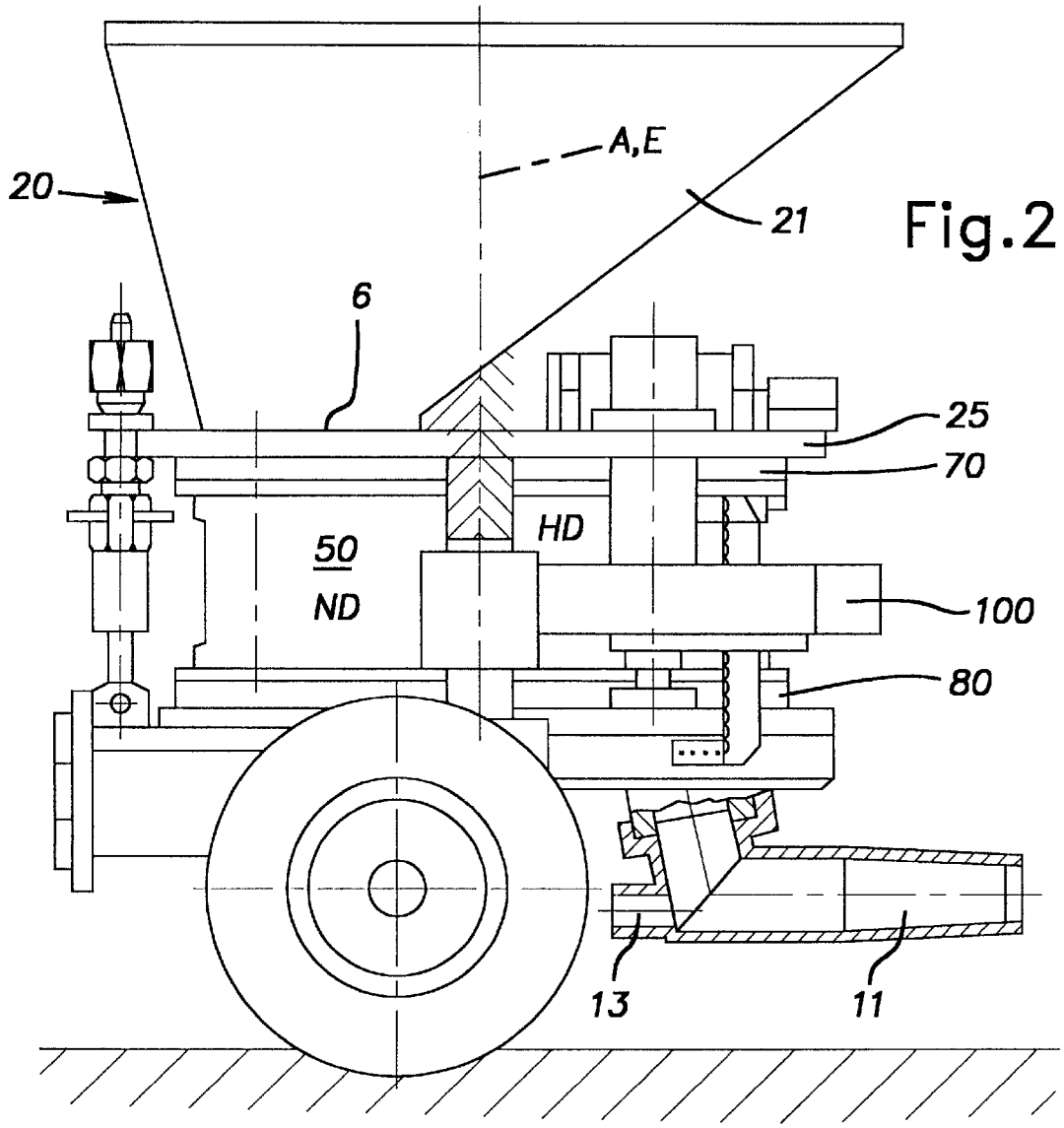
FIG. 2 a lateral view of a simplified spray machine according to the present invention.

In FIG. 2 there is shown, in a lateral view, a rotor concrete spray machine according to the present invention, without representation of the customary provided control and driving devices which are mounted on the same carriage. By means of this figure, the principle inventive functional units shall be presented at the machine according to the present invention which functional units shall later be described in details.

The machine according to the present invention comprises, as is customary, a filling arrangement 20 with a filling hopper 21 with a stirring arrangement (not shown) as well as with a vibrator (not shown). As was shown in connection with FIG. 1, the hopper 21 finally abuts in the filling opening 6 for the rotor bushings 7. The filling arrangement 20 is mounted to a machine frame 25.

The machine according to the invention further comprises a rotor arrangement 50, an upper stationary sealing arrangement 70 as well as a bottom stationary sealing arrangement 80. The rotor arrangement 50 as well as the sealing arrangements 70 and 80 are divided by means of a plane E, along axis A of the rotor and considered in direction of axis A, in a low pressure section ND and a high pressure section HD. In the low pressure section ND the spray medium is filled through the filling arrangement 20 into the rotor arrangement 50 substantially under ambient pressure conditions. At the high pressure section HD, and as was explained with the help of FIG. 1, the spray medium is ejected by means of pressurized air from conduit 4 through conduit 13. The two sections ND and HD are schematically shown in FIG. 2 by the respective shading on both sides of the plane E containing the rotor axis A.

Along the high pressure section HD there is further provided a biasing arrangement 100 with which, on one hand, an easy access to the rotor arrangement 50 as well as to the high pressure sided parts of the sealing arrangements 70 and 80 is enabled and with which, on the other hand, and as will be explained later, the sealings at the high pressure section HD with respect to the rotor are established.

The inventive units of the inventive machine shall now be explained more in details.

Figure 3:
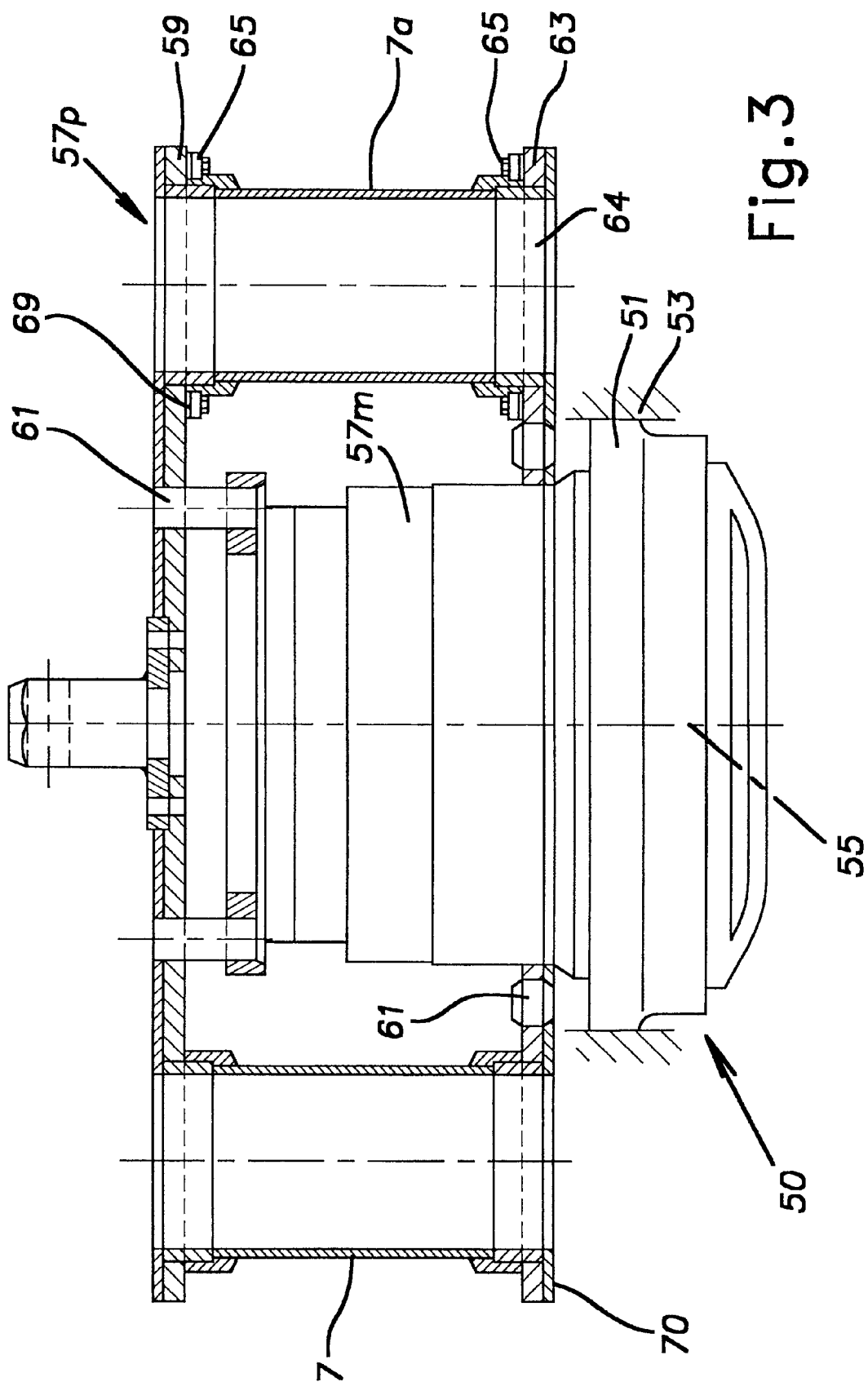
FIG. 3 in a partly sectional view the machine rotor unit with a drive motor at a machine according to the present invention.

In FIG. 3 a rotor unit 50 as implied in a machine according to the present invention is shown in a simplified and partially sectional representation. The rotor unit 50 comprises a hydraulic hub motor 51 as for instance a "Poclain" motor with, as is schematically shown at 53, a motor stator rigidly mounted to the machine frame 25 (FIG. 2) which stator is formed by the motor axis.

Such hydraulic hub motors are known from the technical field of single wheel drives of excavator machines. The construction of such hub motors is extremely flat, as may be seen from considering FIG. 3. The rotor of the hub motor, $57_m$, which rotates around axis 55, is extended, according to the axial extent of the machine rotor $57_p$ and carries the machine rotor $57_p$. The machine rotor $57_p$ is construed from an upper rotor terminating plate 59 which is driven from the motor rotor $57_m$ via upper and lower connecting and torque transferring bolts 61. The arrangement of the upper transferring bolts 61 is shown in top view of the rotor in FIG. 4, too.

Figure 4:
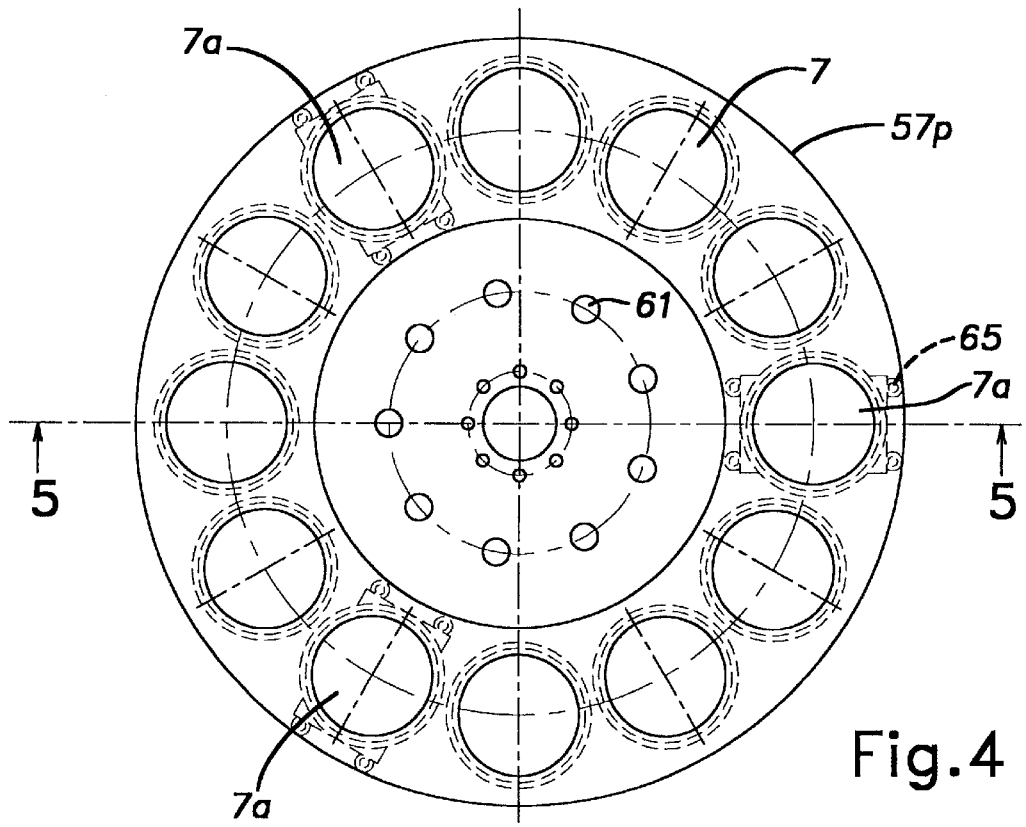
FIG. 4 a top view of the rotor unit according to FIG. 3.

As was explained, along the periphery of the machine rotor $57_p$ a multitude of bushings 7 is provided, for instance comprising twelve bushings, as may be seen from FIG. 4. At least three of the multitude of bushings 7 are construed as biasing bushings which are depicted in FIGS. 3 and 4 with the reference number 7a. They provide for mechanical integrity of the rotor $57_p$. To ensure mechanical integrity, the three bushings 7a are tightened to the upper and to the lower rotor terminating plates 59 and 63 by means of screw bolts 65. The remaining bushings 7 are merely held by the biasing action of the biasing bushings 7a between the plates 59 and 63.

As may be seen, the machine rotor $57_p$, formed as a modular unit by means of the plates 59, 63 as well as the bushings 7a and 7, may be removed by lifting it from the transmitting bolts 61 at the rotor $57_m$ of the hub motor. The machine rotor $57_p$ is extremely light-weight and comprises substantially only parts which are necessary for its proper functioning. This significantly contributes to reduction of the driving power of the motor provided for driving the rotor.

The drive of the machine rotor $57_p$ is directly transmitted from rotor $57_m$ of the hub motor via the bolts 61. The rotor bushings 7, 7a do not transmit any torque which fact further contributes to the "light-weight" construction of the machine rotor $57_p$.

Figure 5:
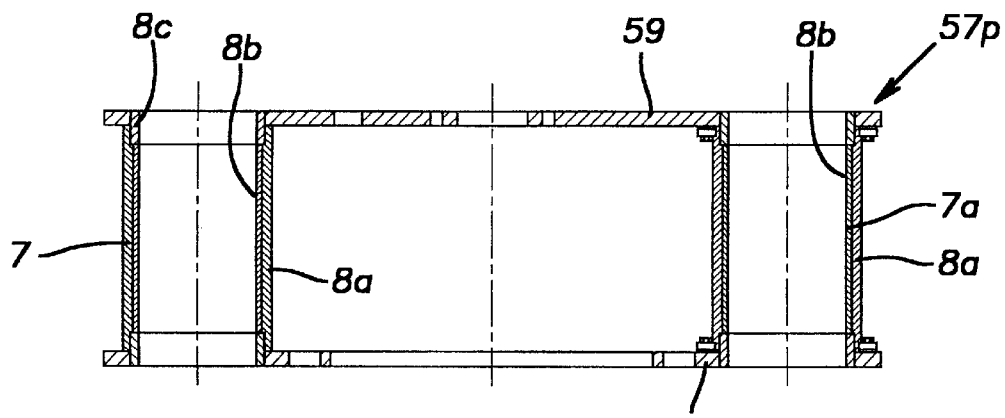
FIG. 5 a modular construction of the machine rotor according to the present invention.

The modularly removable machine rotor $57_p$ is shown in FIG. 5 in a cross-sectional representation. In a preferred realization form and as shown especially in FIG. 5, the bushings 7 and 7a are formed by outer tubes 8a and, introduced therein, exchange bushings 8b. Thus, the bushings 8b may easily be replaced as those parts are extremely exposed to spray medium wear.

Figure 6:
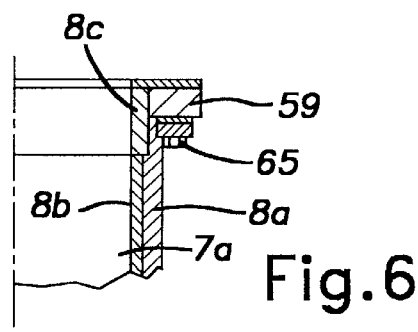
FIG. 6 an enlarged section at the machine rotor according to FIG. 5 which shows the connections of the bushings to rotor end plates.

In FIG. 6 there is shown, in an enlarged representation, the upper terminating part of a bushing 7a with the outer tube 8a, the exchange bushing 8b and further with a junction biasing ring 8c for the exchange bushing 8b. At the lower end the mount of the bushing 7a is equal, as may be seen from FIG. 3. This is also valid for the two-sided mount of bushings 7, which nevertheless have no screw connections 65.

As may be seen especially from FIG. 3 there is preferably provided on the upper rotor terminating plate 59 as well as at the lower rotor terminating plate 63, respectively, a wear exposed protective sheet 69 and which sheets are (not shown) tightened to the respective plates by means of screws.

Figure 1:
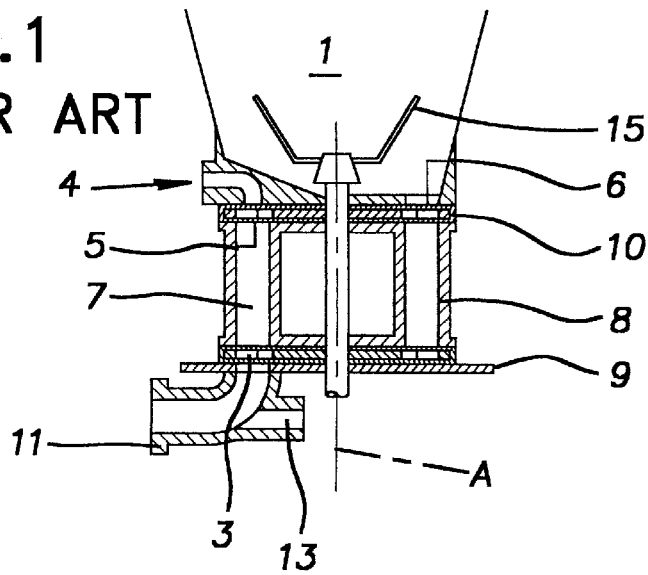
FIG. 1 schematically, a well-known construction of a rotor spray machine.

It must be emphasized that the upper and lower rotor terminating surfaces are exposed to relatively high wear, e.g. from sand or dust, as may be seen from the principal functioning as was explained with the help of FIG. 1. Therefore, the wear protective sheets 69 allow for an easy and quick replacement of the rotor's wear exposed surfaces.

Figure 7:
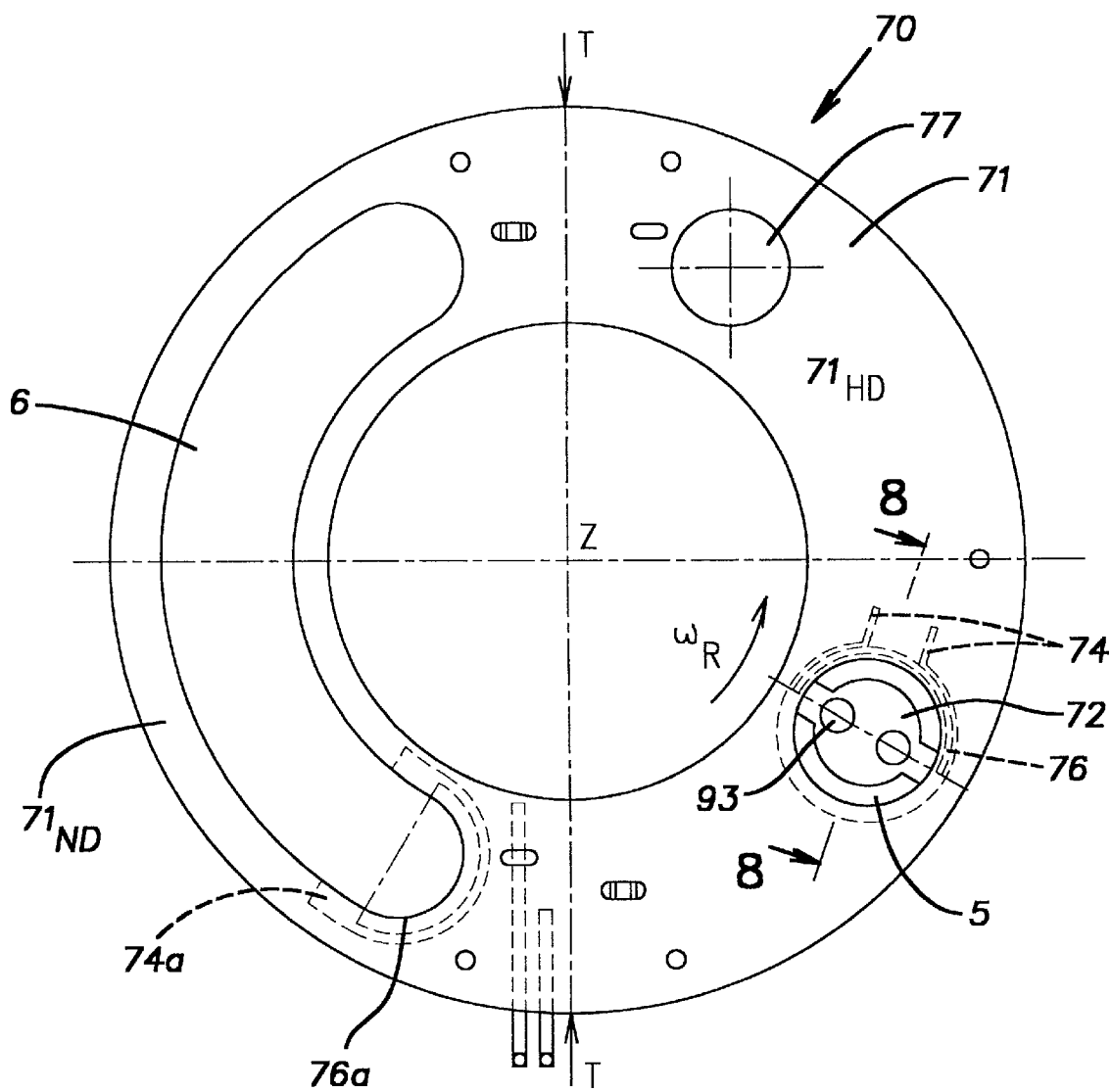
FIG. 7 a searing plate arrangement as it is preferably implied at the machine according to the present invention stationarily with respect to the machine stator or machine frame.

The upper transition area from rotor unit SO to frame-sided connections, namely to the inlet arrangement 20 and to the pressure conduit 4, according to FIG. 1, occurs along an upper sealing plate arrangement 70 according to FIG. 7. The upper sealing arrangement 70, which is stationary, is formed by a substantially annular elastic plate 71, preferably made of rubber and comprising a high pressure sided segment $71_{HD}$ and a low pressure sided segment $71_{ND}$. At the high pressure sided segment $71_{HD}$ the opening 5 for pressurized air according to FIG. 1 is provided.

Figure 8:
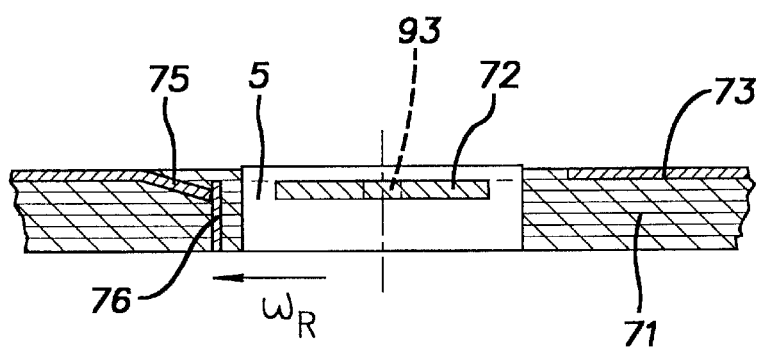
FIG. 8 in a partly sectional representation according to line 8—8 of FIG. 7 a part of the sealing plate arrangement with the inventively provided spring mounted striping-off element.

With respect to the center Z of the annular plate extending in radial direction there is provided in opening 5, as may be seen especially in FIG. 8, a substantially circular cross piece 72 with nozzle openings 93. Thereby, there is realized a nozzle-like transition through openings. The plate 71, preferably made of hard vulcanized rubber, comprises at its upper side a metal cover plate 73 in which the cross piece 72 is formed.

In FIGS. 7 and 8 the rotor movement is shown with respect to the stationary plate 71 with the arrow $\omega_R$. The cover plate 73 is cut adjacent to the opening 5 and as is shown at 74. Thereby, there is formed, as especially shown in FIG. 8, a spring-like piece 75 extending within plate 71. At the end of said-spring like piece 75 there is welded a strip-off element 76 having the shape of a semi-circle (see FIG. 7). The strip-off element 76 abuts at the bottom side of plate 71, i.e. at the surface of the plate which frictionally contacts the upper rotor surface. It is spring mounted due to the spring action of the material of plate 71 and of the spring-like piece 75. Thus, there is provided for a tight auto-adjusting strip element 76 contacting the upper rotor terminating surface.

Via pressurized air opening 5 and via pressurized air conduit 4 according to FIG. 1 the filling content of a respective rotor bushing 7, 7a is ejected. Due to this ejection which occurs at high overpressure the just emptied rotor bushing 7, 7a remains on overpressure with respect to ambient pressure even as such bushing continues rotation in direction $\omega_R$ by rotation of the rotor 50.

Therefore, there is provided, downstream of opening 5, considered in direction $\omega_R$ of rotation, in the plate 71 a pressure decharge opening 77 which communicates with ambient. Through this pressure decharge opening 77 there occurs pressure equalization with ambient before the rotor bushing 7, 7a considered reaches the low pressure section $71_{ND}$ of plate 71.

The low pressure segment $71_{ND}$ of plate 71 is formed as an annular segment and comprises the filling opening 6 according to FIG. 1. At the filling opening 6 more than one, as e.g. four and a half bushings 7, 7a of the rotor unit 50 are simultaneously filled. Considered in the direction $\omega_R$ of rotor rotation, there is provided at the end of opening 6 again a strip-off element 76a located and realized at plate 71 by means of a spring-like piece 74a of covering plate 73 according to FIG. 8 and thus in analogy to the element 76 at the opening 5 for pressurized air.

Important features of the upper plate 71 frictionally contacting the rotor are, on one hand, the strip-off elements 76 and 76a realized within the rubber plate material and spring mounted and, on the other hand, provision of pressure equalization opening 77.

According to FIG. 9 there is provided below the rotor unit 50 a stationary bottom sealing plate 81 which is of annular shape and is made of elastic material, preferably again of rubber. The bottom sealing plate 81, too, may be subdivided in a high-pressure sided segment $81_{HD}$ and a low-pressure sided segment $81_{ND}$. On the high-pressure side there is provided the ejection opening 3 according to FIG. 1 in alignment with the opening 5 for pressurized air according to FIG. 7.

At the ejection opening 3 there is provided a strip-off element 76 arranged and construed as was explained with respect to such strip-off element 76 at the opening 5 for pressurized air. Whereas FIG. 7 shows a representation from above onto the upper sealing plate 71, FIG. 9 shows an upper view on the bottom plate and thus shows the strip-off element 76 freely exposed adjacent the opening 3. Construction of the plate 81 with a covering plate 73 at its bottom, analog to such plate according to FIG. 8, is the same as the construction of the upper plate 71 with the exception that the bottom plate 81 comprises neither a pressure equalization opening 77 nor, as may clearly be seen from FIG. 1, a filling opening 6.

Figure 9:
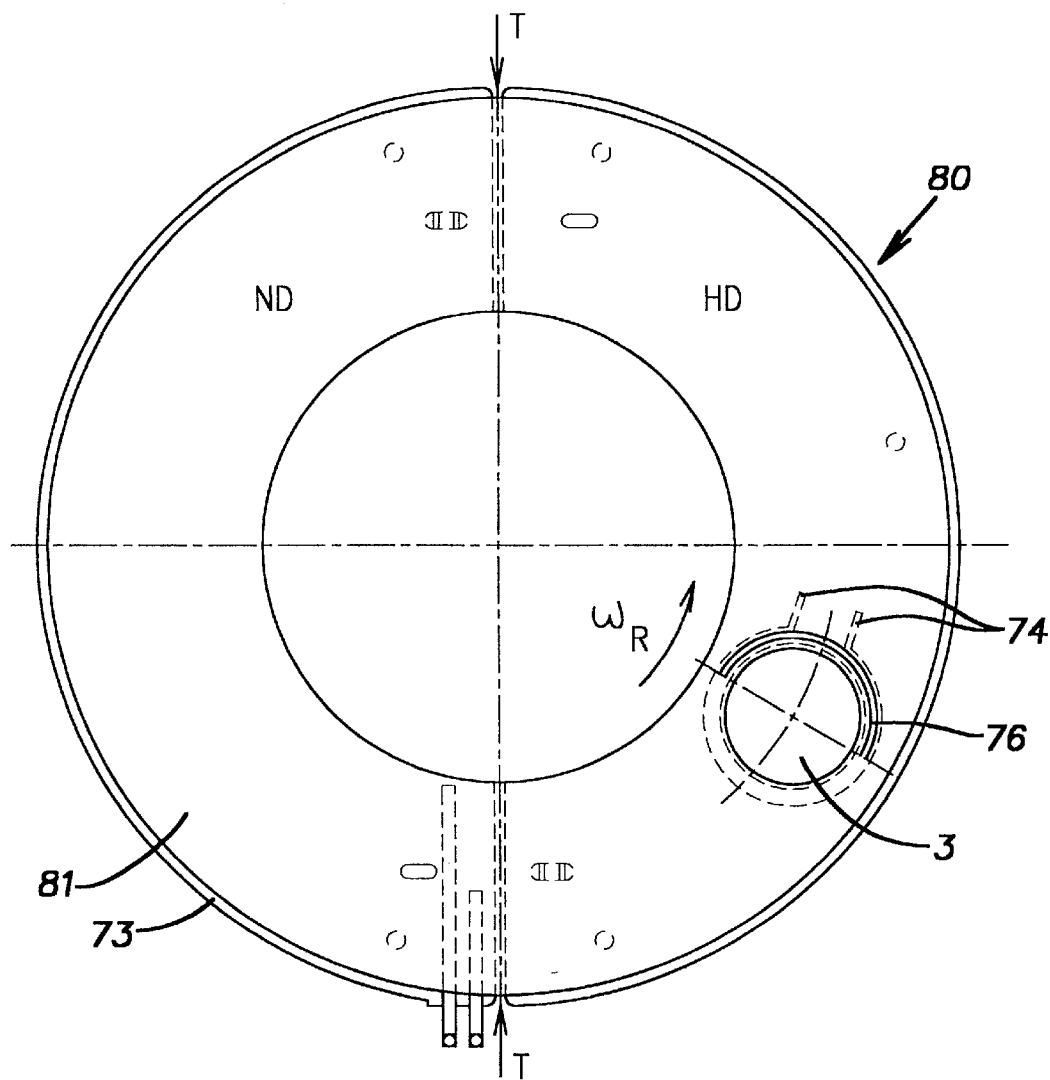
FIG. 9 a top view of the lower sealing plate arrangement which is provided stationarily at a spray machine according to the present invention.

Consideration of FIGS. 1, 7 and 9 together clearly shows that the sealing requirements along the high-pressure section HD between the two plates 71, 81 and the rotor unit 50 are considerably higher than along the low-pressure section ND. Thus, by means of appropriate dimensioning the thickness of the respective sealing plates 71 and 81 along the low-pressure segments $71_{ND}$, $81_{ND}$ slightly smaller than along the high-pressure segments $71_{HD}$, $81_{HD}$, it is possible to significantly reduce the torque reacting onto the rotor drive and thereby reduces the drive power requirements at the hub motor 55, 57 (FIG. 3).

Figure 10:
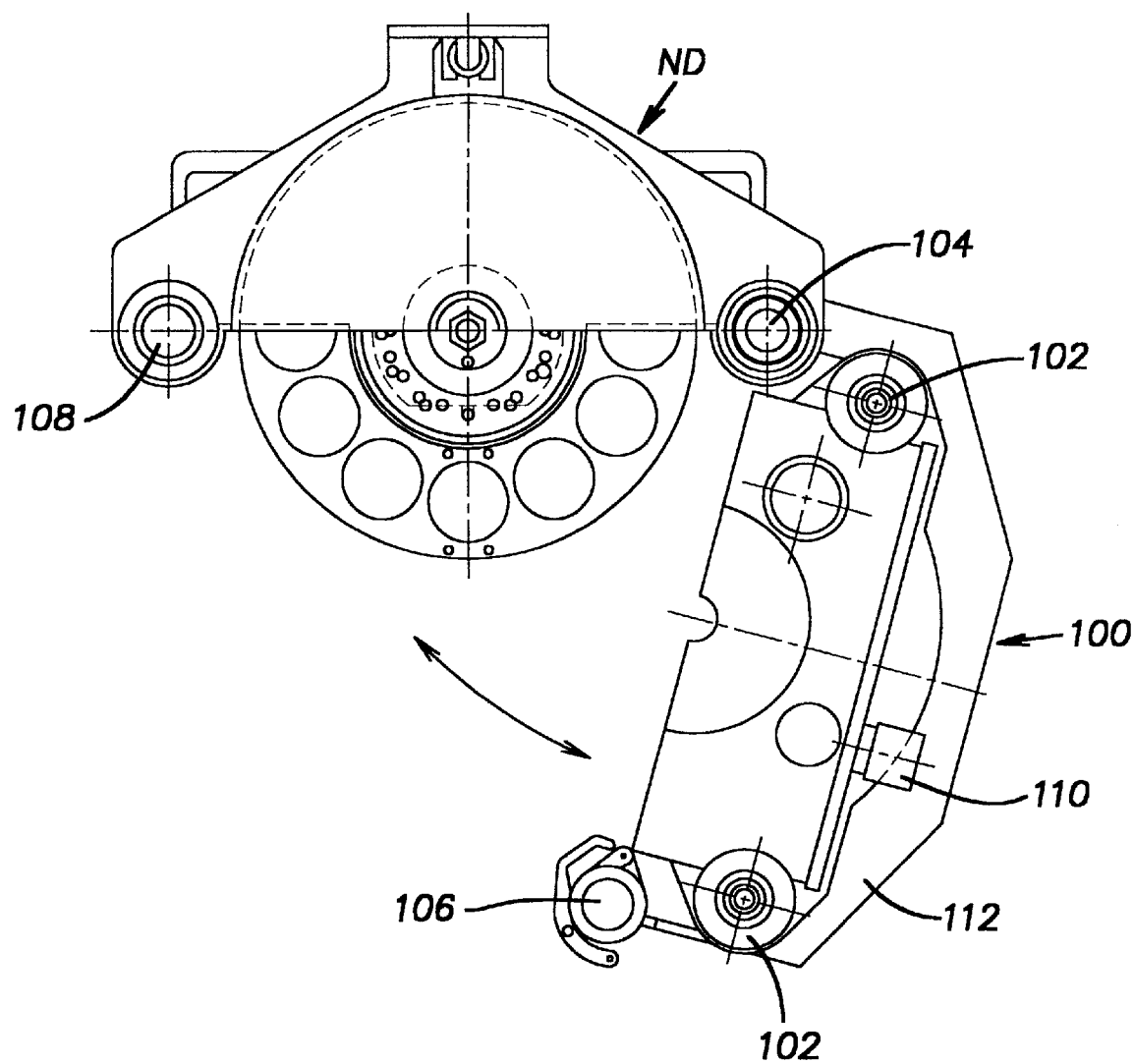
FIG. 10 in a simplified representation and in top view the inventive spray machine with inventively pivotably opened high pressure side sealing arrangement and with the biasing arrangement.

In FIG. 10 there is shown an upper view onto a machine according to the present invention whereby for clearness' sake all devices mounted on top of the machine are not represented. From FIG. 10 a most important feature of the machine according to the present invention may be seen:

The upper and the bottom sealing plates 71 and 81 are, as shown with the reference T in the FIGS. 7 and 9, respectively, separated into segments $71_{HD}$, $71_{ND}$ and $81_{HD}$, $81_{ND}$.

As will be described, the two high-pressure segments $71_{HD}$ and $81_{HD}$ are pivotable around an articulation 104 arranged vertically, i.e. in the cutting plane according to E and may be biased by means of biasing piston arrangements 102. Opposite, with respect to the pivoting articulation 104, there is provided a locking arrangement 106 with which the biasing arrangement 100 may be locked in closed position to the low-pressure sided locking member 108.

The biasing piston arrangement 102 with further devices which are pivoted together with the biasing arrangement 100 as filter stages for the pressure equalization opening 77, a connection 110 for pressurized air to conduit 4 according to FIG. 1 etc. are mounted to a pivotable carrying frame 112.

Figure 11A:
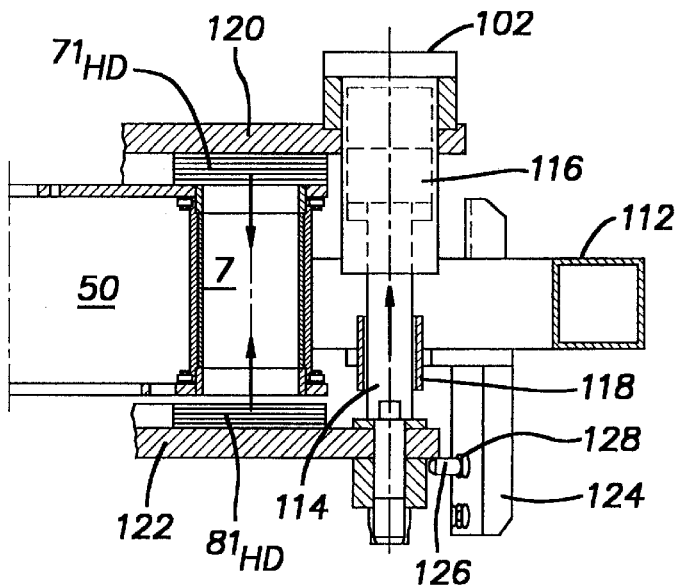
FIG. 11a the biasing piston arrangements provided at the to 11c machine according to the present invention according to FIG. 10 in sealingly biased (a), partly released (b) and entirely released (c) positions.
Figure 11B:
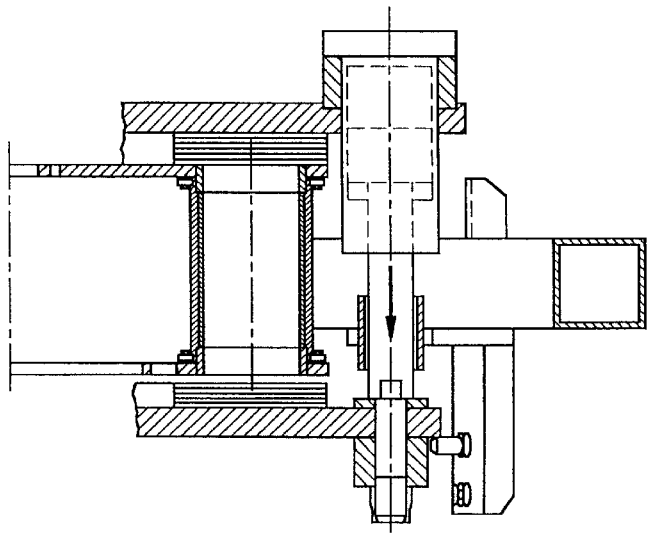
Figure 11C:
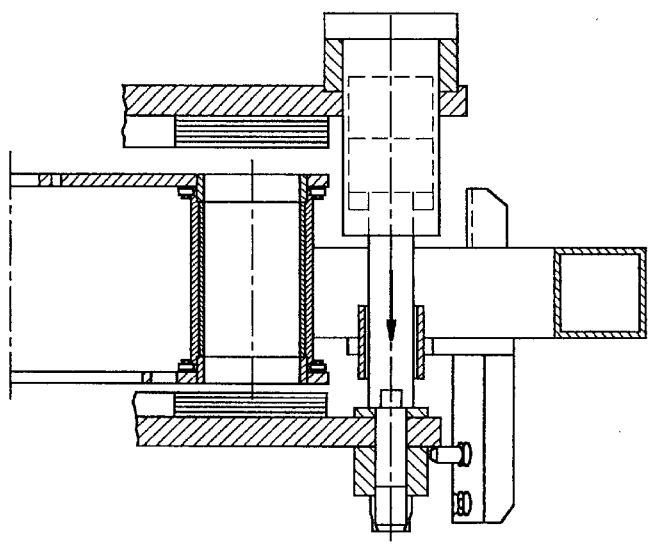

In the FIGS. 11a to 11c there is shown one of the two equally construed biasing piston arrangements 102 in a biasing position (a), in released and downwards lowered position (b) and in released upwards lifted position (c). These positions will be explained.

According to FIG. 11a, which shall be explained in details for afterwards understanding the movement kinetics of the two biasing piston arrangements 102 by means of the FIGS. 11b and c, the piston rod 114 of a cylinder/piston arrangement 116 is axially freely movable within a gliding bushing 118. The cylinder of the cylinder/piston arrangement 116 carries via a mounting plate 120 which, according to FIG. 10, carries both biasing cylinder arrangements 102, the high-pressure sided segment $71_{HD}$ of plate 71. The piston rod 114 on the other hand carries, again via a carrier plate 122, which is commonly provided for both biasing cylinder arrangements 102, the high-pressure segment $81_{HD}$ of the bottom plate 81.

By contraction of the hydraulic cylinder/piston arrangement 116 the two high-pressure segments $71_{HD}$ and $81_{HD}$ are symmetrically pressed towards each other and to the rotor unit 50 and their bushings 7, 7a.

By means of an adjusting bar 124, slidable with respect to the frame 112, a lower abutment 126 for piston rod 114 of the cylinder/piston arrangement 116 may be positioned. This abutment 126 lies in a biased position of the arrangement 102 according to FIG. 11a and considered in an axial direction distant below an abutment surface 128 at the piston rod 114.

If the cylinder/piston arrangement 116 is now released according to FIG. 11b, first the piston rod 114 is moved onto the abutment 126. Cylinder and plate 120 as well as segment $71_{HD}$ remain, gravity-driven, stationary. Thus, the bottom seal plate segment $81_{HD}$ is lowered acc. to FIG. 11b.

By further expanding the cylinder/piston arrangement 116 and as piston rod 114 is on abutment, the cylinder is lifted according to FIG. 11c, so that the mounting plate 120 is lifted commonly with the high-pressure segment $71_{HD}$ of the upper pressure or sealing plate 71.

As will be shown in connection with the hydraulic scheme, the two biasing cylinder arrangements 102 respectively with their cylinder/piston arrangements 116 are synchronously operated so that in a simple way, on one hand, the required sealing biasing according to FIG. 11a with respect to the rotor unit 50 is realized and, on the other hand, a fully released position according to FIG. 11c in which, according to FIG. 10, the entire frame sided high-pressure section of the biasing arrangement 100 may be opened by pivotment.

By predetermining the pressure onto the biasing cylinder arrangements 102 according to FIG. 11a the required sealing pressure may be adjusted independently from the sealing conditions at the low-pressure sided parts ND according to FIG. 10. Thus, an optimum is reached in that there, where it is required, namely at the HD segments, high surface pressures may be realized whereas, uninfluenced from the high-pressure sided surface pressures, at the low-pressure side, the sealing conditions may be loosened, i.e. significantly lower surface pressures may be installed there. By this feature, the power of the rotor drive motor and especially of the hub motor, as was described, may be reduced by more than 50%. If e.g. at the high-pressure side and at the low-pressure side the same sealing surface pressures are installed between the plates 81, 71 and rotor unit 50 and there results then a required drive power of 41 kW, then and by inventive splitting of low-pressure side and high-pressure side at the inventive machine, the required drive power may be reduced to approx. 19 kW.

Figure 12:
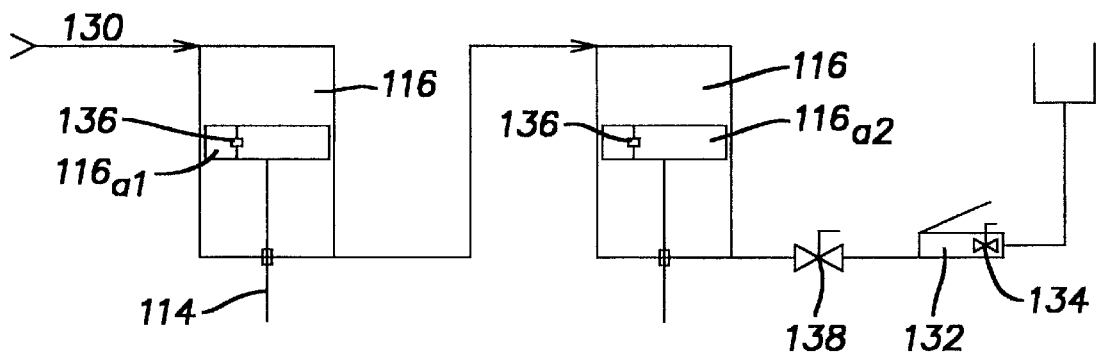
FIG. 12 schematically and simplified the hydraulic scheme for operating the biasing piston arrangements according to FIG. 11 and as provided at the machine according to FIG. 10.

In FIG. 12 there is schematically shown the hydraulic scheme for the cylinder/piston arrangements 116 of the biasing arrangements 102 according to FIG. 11. The two cylinders of the arrangement 116 are connected in series, whereby the volume below piston $116_{a1}$, taking the volume occupied by piston rod 114 into account, is equal with the volume above piston $116_{a2}$, Via conduit 130 the operating pressure of the machine, e.g. of 18 bar, is applied. For spanning the biasing cylinder arrangements, a high-pressure is generated via a hand pump 132 so that both pistons $116_{a1}$, $116_{a2}$ are biasingly urged upwards (FIG. 11). Their equal volumina mentioned make sure that both pistons $116_{a1}$, $116_{a2}$ move the same biasing distance.

For releasing the biasing cylinder arrangement 102, the high-pressure built up by means of hand pump 132 is released for instance with the help of a manually operatable valve 134. Thereby, the two pistons $116_{a1}$, $116_{a2}$ move downwards due to the machine basic pressure of for instance 18 bar and thereby, see FIG. 11, release the rotor unit 50.

At the pistons $116_{a1}$, $116_{a2}$ mechanical operatable non-return valves 136 of known type are provided. If for instance piston $116_{a1}$ reaches, e.g. due to leakage, the lower surface of its cylinder before piston $116_{a2}$ reaches the respective surface in its cylinder, then mechanically the valve 136 at piston $116_{a1}$ is opened so that, driven by the basic pressure of the machine, the piston $116_{a2}$ is finally also driven in abutment position. Thus, synchronized movement of the pistons $116_{a1}$, $116_{a2}$ is automatically reinstalled whenever necessary.

Between the hand pump 132 and the respective connection to one of the cylinder/piston arrangements 116 there is further and preferably provided a manually operatable valve 138.

I claim:

1. A spray machine with a driven rotor unit (50) which rotor unit carries at its periphery a multitude of bushings which are open at both sides and which are arranged with their axes pointing in a direction with at least one direction component parallel to an axis of said rotor and comprising, stationary with respect to a machine frame, a filling opening (6) at a filling arrangement (20), a pressurized air inlet opening (5), an ejection opening (3) being located opposite to said pressurized air inlet opening (5) considered in direction of said axes of said bushings, whereby all said openings are so arranged that, when said rotor unit rotates, the openings of said bushings pass over said openings, and further comprising, stationary with respect to said machine frame at both sides of said rotor unit (50), sealing plate arrangements (70, 80), characterized by the fact that surface pressure between said sealing plate arrangements and said rotor unit in an area comprising said filling opening (6) is lower than surface pressure of said sealing plate arrangements to said rotor unit (50) in an area containing said pressurized air inlet opening (5) and said ejection opening (3).

2. The spray machine according to claim 1, characterized by the fact that the sealing plate arrangements (70, 80) are each formed of two parts, a first part being arranged in said area comprising said filling opening (6), a second of said parts being arranged in said area comprising said pressurized air inlet opening and said ejection opening (3).

3. The spray machine according to claim 1, characterized by the fact that a biasing unit (102) is provided which biases said sealing plate arrangements (80, 70) towards said rotor unit (50) and which may be biased towards said rotor unit considerably more in said area comprising said pressurized air inlet (5) and said ejection opening (3) than in said area with said filling opening (6).

4. The spray machine according to claim 1, characterized by the fact that said sealing plate arrangements (70, 80) comprise each a first part ($71_{ND}$, $81_{ND}$) in said area comprising said filling opening and a second part in said area with said pressurized air inlet and said ejection opening, said machine frame comprising a pivotable section (100) with said parts of said sealing plate arrangements comprising said pressurized air inlet and said ejection opening respectively, said pivotable section further comprising a biasing arrangement (102) which biases said parts towards said rotor unit.

5. The spray machine of claim 2, wherein one part of each of said sealing plate arrangements may adjustably be biased towards and from said rotor unit.

6. The spray machine according to claim 4, characterized by the fact that said biasing arrangement (102) comprises at least two biasing piston/cylinder arrangements cooperating with said parts of said sealing plate arrangements.

7. The spray machine of claim 5, characterized by the fact that said biasing piston/cylinder arrangements each comprise a cylinder and a piston respectively mounted to one of said parts of said sealing plate arrangements and cooperating therewith in such a manner that as said piston/cylinder arrangements are contracted, both of said parts are biased towards said rotor unit disposed therebetween.

8. The spray machine of claim 6, characterized by the fact that said piston/cylinder arrangements are freely movable with respect to said frame in biasing direction so that as said piston/cylinder arrangements are expanded, there is first unbiased one of said parts of said sealing plate arrangements from said rotor unit and is driven on an abutment and then the second part of said sealing plate arrangements is unbiased from said rotor unit.

9. The spray machine according to one of the claims 5 to 7, characterized by the fact that said piston/cylinder arrangements are connected in series to a pressurized medium source and that there is provided a manually operatable pressurizing member in series too and acting on said piston/cylinder arrangements for generating biasing pressure.

10. The spray machine according to claim 1, characterized by the fact that said sealing plate arrangements each comprise an elastic plate.

11. The spray machine of claim 10, wherein said elastic plate is predominantly made of rubber.

12. The spray machine of claim 11, characterized by the fact that said sealing plate arrangements comprise each a metal plate arranged opposite to the face of the said sealing plate arrangements facing said rotor unit, said metal plates carrying spring mounted strip-off members which are freely exposed at the face of said sealing plates facing said rotor unit.

13. The spray machine of claim 1, further comprising a pressure release opening (77), stationary with respect to said machine frame and arranged subsequent to said pressurized air inlet opening (5) considered in drive direction of said rotor unit (50), said pressure release opening (77) providing for a flow connection between said bushings and ambient.

14. The spray machine of claim 1, characterized by a hydraulic hub motor driving said rotor unit (50).

15. A spray machine with a driven rotor unit (50), said driven rotor unit carrying at its periphery a plurality of bushings which are open at both sides and which are arranged with axes pointing in a direction with at least one direction component parallel to an axis of said rotor unit and comprising, stationary with respect to a machine frame, a filling opening (6) at a filling arrangement (20), a pressurized air inlet opening (5), an ejection opening (3) being located opposite to said pressurized air inlet opening (5) considered in direction of said axes of said bushings, whereby all said openings are so arranged that, when said rotor unit rotates, the openings of said bushings pass over said openings, wherein the rotor unit (50) is driven by a hydraulic hub motor (51).

16. The spray machine of claim 15, wherein the rotor unit (50) comprises a machine rotor (57p) with said bushings (7, 7a) which is removable from said motor (51) as a integer module.

17. The spray machine of claim 16, wherein the machine rotor (57p) comprises plate arrangements which are distant from each other, considered in direction of the axis of said rotor, said plate arrangements being interconnected by at least a part of said plurality of bushings (7, 7a).

18. The spray machine according to claim 15, wherein each of said bushings comprise an outer tube (8a) and an exchangable inner tube (8b).

19. The spray machine according to claim 15, wherein said rotor unit (50) comprises two axially distant plate arrangements (59, 63) and further comprises a wear plate

(69) at each of said plate arrangements, said wear plate being arranged, relative to a direction of the axis of said rotor unit (50), at the outer sides of said plate arrangements.

20. The spray machine of claim 19, wherein each of said wear plates are formed by a sheet of metal.

21. The spray machine of claim 17, wherein said motor (51) is operationally connected with both of said plate arrangements (59, 63), whereby said bushings (7, 7a) are free of torque transmission.

* * * * *

UNITED STATES PATENT AND TRADEMARK OFFICE
CERTIFICATE OF CORRECTION

PATENT NO. : 5,904,303
DATED : May 18, 1999
INVENTOR(S) : Egli

It is certified that error appears in the above-identified patent and that said Letters Patent is hereby corrected as shown below:

Column 5, Line 54, after protective sheet 69, delete "and".

Column 5, Line 63, delete "SO" and insert --50--.

Column 8, Line 54, delete "18 bar" and insert --18bar--.

Column 8, Line 65, delete "18 bar" and insert --18bar--.

Signed and Sealed this

Twenty-eighth Day of September, 1999

Attest:

Q. TODD DICKINSON

*Attesting Officer*     *Acting Commissioner of Patents and Trademarks*